March 5, 1968

S. FISCHER ETAL 3,371,376

APPARATUS FOR THE PRODUCTION OF HOLLOW
OBJECTS WITH RELATIVELY WIDE OPENINGS

Filed Sept. 24, 1963

INVENTORS
STEFAN FISCHER
AND RAINER FISCHER

BY Kleinberg & Lilling
ATTORNEYS

United States Patent Office 3,371,376
Patented Mar. 5, 1968

3,371,376
APPARATUS FOR THE PRODUCTION OF HOLLOW
OBJECTS WITH RELATIVELY WIDE OPENINGS
Stefan Fischer, Korresgarten, and Rainer Fischer, Buch-
bitze, both of Lohmar, Bezirk Cologne, Germany
Filed Sept. 24, 1963, Ser. No. 311,011
Claims priority, application Germany, Sept. 26, 1952,
F 37,884
3 Claims. (Cl. 18—5)

The instant invention is concerned with apparatus for the production of bottles and similar hollow objects from thermoplastic material in workable form. In particular, the invention is concerned with apparatus for the manufacture of bottles and the like having relatively large neck opnings, wherein the cross-section of the filling opening or bottle neck will be at least almost the same size as the cross-section of the body of the remainder of the bottle. Thus, for example, in such a container, the neck opening will be almost identical in dimensions with the cross-section of the bottle and will usually be of relatively small wall thickness.

There are, of course, several presently known apparatus for the production of blow molding bottles and the like. Such apparatus generally include means for the extrusion of a tube or parison of plastic material in workable form. The tube or parison is then expanded by a blowing medium in a mold. These present apparatus have certain inherent defects. For example, if the tube or parison is of relatively large diameter, it will not be blown within the mold to a great extent. This inhibits the production of an attractive product in that the closing of the mold halves about the tube or parison will produce a weld or tear line across the bottom of the container and up opposite portions of its side wall. If, however, the tube or parison is of relatively small diameter, and is smaller in diameter than the filling neck or opening of the container, then the interior dimension of the filling opening or neck of the container may not be controlled or finished in the blowing operation and special finishing and secondary operations, such as reaming, will be required to finish the interior diameter of the neck or opening of the container.

This invention provides an apparatus for the production of hollow articles having none of the above-mentioned defects.

The finished object will be produced from warm thermoplastic material in workable form. A tube or parison of this material will be closed at one of its ends and will be blown into the finished shape within a divided and partable mold. Prior to the closing of the open end of the tube or parison, the tube or parison will be partially expanded until it at least is in proximity to the interior cavity of the mold. This widening of the tube or parison can be accomplished progressively so that the tube or parison is blown against the internal cavity of the mold wall first at its closed end and then expanded towards its open end. However, in many instances it will be sufficient to open only the lower edge against the internal cavity of the mold. This widening of the parison or tube may be accomplished by introducing pressure means, as for example, air pressure, within the interior portion of the extruded tube or parison. Such widening or expansion may further be accomplished by mechanical means, operating simultaneously with the introduction of the air pressure.

The invention further provides a device for the production of hollow objects comprising an extruder to produce a tube or parison of workable material, and a divided mold to receive the said tube. The device further includes means to inflate the tube or parison while it is within the mold to conform the exterior of the parison to the internal cavity of the mold. The tube or parison, however, will be expanded or widened in a predetermined manner for the most effective blowing and inflating of the tube. The device for expanding or widening the tube can grasp the open end of the parison as with mechanical claws, grippers, or the like, suitably actuated from a control panel. A movable conical mandrel or the like, which may be movable in a direction of the longitudinal axis of the tube or parison, may be utilized to operate the previously described claws. The conical mandrel may further be utilized to provide the blowing medium for expanding the tube or parison and to close the open end of the said tube or parison during the blowing operation. At the completion of the blowing operation, the conical mandrel may squeeze off any excess material by impinging the same between the said mandrel and the mold.

The invention further provides an axially movable blowing and squeezing head which will include an independently movable blowing tube. The said blowing tube will be movable along the axis of the extruded tube or parison. The blowing tube can, if desired, contain a multiplicity of openings. The openings may, if desired, guide the expansion medium in a preferred direction against the tube to be blown.

With these objects in view, the invention consists of the novel features of construction and arrangement of parts which will appear in the following specification and recited in the appended claims, reference being had to the accompanying drawings in which the same reference numerals indicate the same parts throughout the various figures, and in which:

Figure 1:
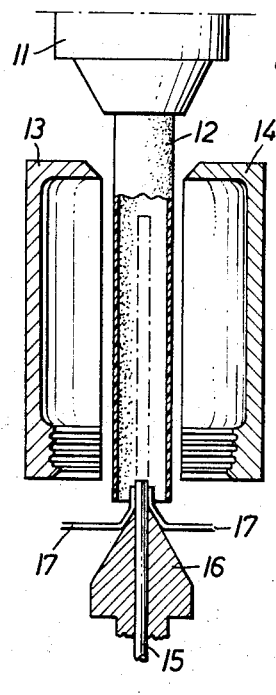
FIG. 1 is an elevational view partly in section and partly in phantom taken through the center of an extruded tube and partable molds, showing the first step in the production of a wide neck bottle, primarily diagrammatically.

Referring to the drawings, there is shown in a diagrammatic manner, one embodiment of the instant invention.

The device may include an extrusion head 11 which may be connected to an extruder and which will produce a tube or parison 12 of thermoplastic material in workable form.

The extrusion head 11 is not shown or described in detail as it in and of itself forms no part of the instant invention. Any means for supplying a tube or parison in workable form between opened mold halves may be utilized in conjunction with the inventive concept of this invention.

Figure 2:
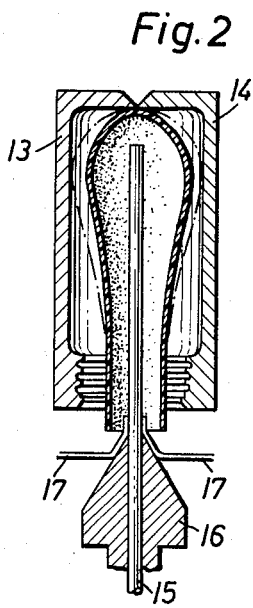
FIG. 2 is a view corresponding to FIG. 1 but showing a second step in the production of a wide neck bottle.

The tube 12 is placed between the open mold halves 13 and 14 and is of sufficient length so that its lower end will project downward beyond the lower portion of the said mold halves 13 and 14. As is conventional, the mold halves 13 and 14 will have squeezing edges, so that when the said mold halves close, as shown in FIG. 2, the squeezing edges will separate the portion of the extruded tube or parison 12 within the mold halves 13 and 14 from the remainder of the tube being extruded from the extrusion head 11. The separated tube or parison 12 will then be held within the internal cavity of the mold without coming into contact with the remainder of the said internal cavity of the mold.

It will be evident that without further mechanism, it will be impossible to blow the extruded tube tightly against the internal cavity of the mold halves 13 and 14. This is in view of the relatively wide bottom opening or neck of the bottle being blown. The expansion medium whether it be air or the like, if blown within the said tube may easily escape from the bottom. Although enough air may be introduced within the tube to partially blow the same and expand the said tube, the air pressure may not build up to an amount sufficient to blow the extruded tube or parison 12 tightly against the mold halves 13 and 14, thereby producing a satisfactory container. This invention then contemplates an apparatus and method or combination of such means, to insure the proper blowing of the tube 12.

To accomplish the above, there is provided and shown in the drawings, an axially movable blowing tube 15, a conical mandrel 16, which may also be movable in a direction corresponding to the longitudinal axis of the extruded tube 12, and a multiplicity of radially movable claws 17.

Figure 3:
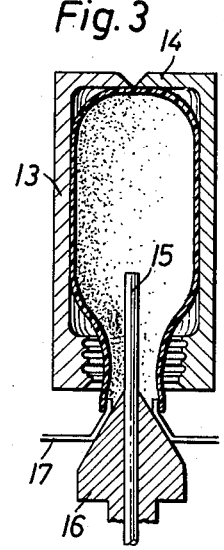
FIG. 3 is a view corresponding to FIG. 2, but showing a still further step in the production of a wide neck bottle.

The blowing tube 15 will not necessarily be movably arranged, but may be fixed in position. Prior to or immediately after the extrusion of the tube or parison 12, the blowing tube 15 may be urged into the position shown in phantom in FIG. 1. After the mold halves 13 and 14 close about the extruded tube 12, and the upper end of the tube is closed, air or another expansion medium can be introduced through the blowing tube 15 to widen a portion of the extruded tube as shown in FIG. 2. As the blowing tube 15 is brought downwards, the air or other expansion medium will pre-widen successively lower portions of the extruded tube, commencing with the closed end thereof, as shown in FIGS. 2 and 3. As the lower portion of the extruded tube 12 is expanded, the conical mandrel 16 may be urged within the opening to the extruded tube 12 whereby the same will be sealed off thereby permitting the full pressure of the air being blown within the extruded tube 12 to build up, and thereby urging the said tube 12 into tight intimate contact with the inerior cavity of the closed mold halves 13 and 14.

In certain instances, it will be necessary to utilize gripper claws 17 moving radially to grasp the end of the tube 12 along its inner periphery and then to widen and enlarge the said end of the extruded tube. This enlarging or widening of the end of the extruded tube 12 will permit the conical mandrel 16 to move upward to the predetermined position whereby it will seal the open end of the said tube 12 and permit the proper formation of the filling opening or neck of the finished object being formed. It is not always necessary to utilize a special blowing tube 15. The conical mandrel may in such instance possess an opening such as at the tip thereof for supplying air under pressure or other expansion medium.

Figure 4:
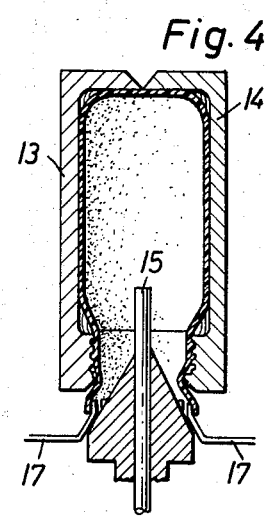
FIG. 4 is a view corresponding to FIG. 3, but showing yet another step in the production a wide neck bottle.

After the closing of the mold halves 13 and 14 about the extruded tube 12, and the closing of the upper end of the said tube 12, the tube will be expanded in the area of its closed end, as will be seen in FIG. 2, by means of the introduction of air or other expansion medium. This will continue as shown in FIG 3. As the expansion continues, however, the conical mandrel 16 will be moved axially toward the mold halves 13 and 14. The upward movement of the conical mandrel 16 will act as a cam to cause the gripping claws 17 to move radially outward. Thus, the said gripping claws 17 will grasp the inner periphery of the opening of the extruded tube 12. The exit gap for the air introduced within the interior of the extruded tube 12 will be decreased in view of the upward movement of the expanding conical mandrel 16 within the said opening of the tube 12. Thus, the accumulation of air under pressure within the extruded tube 12 will continuously increase. This will cause further expansion of the tube 12 as shown in FIG. 4 until the extruded tube 12 is in contact with the internal cavity of the closed mold halves 13 and 14.

Figure 5:
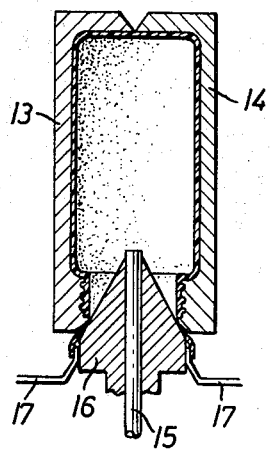
FIG. 5 is a view corresponding to FIG. 4 but showing the final position of the production of a wide neck bottle prior to the ejection of the said bottle from the mold halves.

As will be seen in FIG. 5, the conical mandrel 16 will continue its upward movement until it is pressed firmly against the mold halves 13 and 14. When in that position, it will squeeze off the surplus material of the tube 12 and further serve to tightly close and seal the opening from the tube 12. Thus, the air under pressure may now build up to its full amount thereby assuring intimate contact between the expanded tube 12 and the interior cavity of the closed mold halves 13 and 14. Downward movement of the conical mandrel 16 will then serve to permit the claws 17 to release the severed portion of the tube 12.

It will be understood that the invention described herein will not be limited to that depicted in the drawing. Many diverse variations are possible without departing from the inventive concept of this invention. For example, the conical mandrel can be brought into close contact with the closed mold halves 13 and 14 earlier so that the lower tube end may be grasped before any widening of other of the tube 12 sections. Further, the widening of the tube 12 may be accomplished in any predetermined manner merely by varying the points at which the air or other expansion medium escapes from the blow tube. Still further, other devices for mechanically seizing and widening the open end of the tube 12 may be provided.

While there are above disclosed but a limited number of embodiments of the structure and product of the invention herein presented, it is possible to produce still other embodiments without departing from the inventive concept herein disclosed, and it is desired, therefore, that only such limitations be imposed on the appended claims as are stated therein, or required by the prior art.

Having thus described our invention and illustrated its use, what we claim as new and desire to secure by Letter Patent is:

1. An apparatus for the manufacture of hollow objects having a relatively wide neck opening, from thermoplastic material in workable form, comprising: means for producing an open ended tube of thermoplastic material, a divided mold to enclose said tube and thereby close one end thereof, means for introducing an expansion medium within said tube thereby blowing the same into contact with the internal cavity of said mold, means for widening a portion of said tube prior to the final blowing of the said tube into the said internal cavity, said widening means including gripping claws which are adapted to seize and expand the said tube at its open end, and a control device to control the actuation of the said gripping claws, said control device for the said gripping claws being comprised of a conical mandrel, and means to move the said conical mandrel along the direction of the longitudinal axis of the said tube whereby the axial movement of the conical mandrel will serve to radially move the gripping claws together or apart.

2. An apparatus for the manufacture of hollow objects having a relatively wide neck opening, from thermoplastic material in workable form, as set forth in claim 1; wherein the said conical mandrel will serve as a severing means to impinge against the mold and thereby remove excess thermoplastic material from the open end of said tube.

3. An apparatus for the manufacture of hollow objects having a relatively wide neck opening, from thermoplastic material in workable form, according to claim 1, further including a movable blow pipe, said blow pipe being axially movable within said tube, whereby the portion of said tube being blown may be controlled.

References Cited

UNITED STATES PATENTS

| | | | |
|---|---|---|---|
| 2,787,023 | 4/1957 | Hagen et al. | 264—98 |
| 2,928,120 | 3/1960 | Leghorn et al. | 264—98 |
| 3,009,196 | 11/1961 | Hagen | 18—5 |
| 3,084,395 | 4/1963 | Thielfoldt | 264—98 |
| 3,127,636 | 4/1964 | Heider | 264—98 |
| 3,224,038 | 12/1965 | Budesheim | 18—5 |
| 3,100,317 | 8/1963 | Perry | 264—98 |

ROBERT F. WHITE, *Primary Examiner.*

A. R. NOË, *Assistant Examiner.*